United States Patent
Osterle et al.

(10) Patent No.: US 6,428,258 B1
(45) Date of Patent: Aug. 6, 2002

(54) NON CUTTING HOLE-SHAPING AND THREAD-FORMING STAINLESS SCREW AND PROCESS WITH IMPACT FOR DRIVING IN THE SAME

(75) Inventors: Helmut Osterle, Feldkirch (AT); Erich Palm, Au (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 08/849,940

(22) PCT Filed: Dec. 18, 1995

(86) PCT No.: PCT/EP95/04995

§ 371 (c)(1),
(2), (4) Date: Sep. 24, 1997

(87) PCT Pub. No.: WO96/19676

PCT Pub. Date: Jun. 27, 1996

(30) Foreign Application Priority Data

Dec. 21, 1994 (DE) .......................................... 44 45 815

(51) Int. Cl.[7] .................................................. F16B 25/00
(52) U.S. Cl. ........................................ 411/386; 411/411
(58) Field of Search ............................... 411/386, 387.1, 411/411, 487, 493, 387.2, 387.4

(56) References Cited

U.S. PATENT DOCUMENTS

| | | | |
|---|---|---|---|
| 2,015,159 A | | 9/1935 | Rosenberg |
| 3,156,152 A | | 11/1964 | Reed |
| 4,068,554 A | * | 1/1978 | Hirabayashi ................ 411/386 |
| 4,295,351 A | * | 10/1981 | Bjorklund |
| 4,463,753 A | * | 8/1984 | Gustilo |
| 4,473,984 A | * | 10/1984 | Lopez |
| 5,122,132 A | * | 6/1992 | Bremer ........................ 411/386 |
| 5,199,839 A | * | 4/1993 | DeHaitre ..................... 411/387 |

FOREIGN PATENT DOCUMENTS

| | | |
|---|---|---|
| DE | A1-25 55 647 | 6/1977 |
| DE | A1-3235447 | 5/1983 |
| DE | 54 903 | 1/1991 |
| EP | 0 464 071 B1 | 1/1992 |
| EP | 0 517671 | 12/1992 |
| FR | 1008781 | 5/1952 |
| WO | WO 94 25764 | 11/1994 |

OTHER PUBLICATIONS

DE–Z: Der Konstrukteur [The Designer] Jun. 1992, pp. 52 and 54 (English abstract annexed).
Catalog HILTI 1993/94, pp. 2/10 and 5/14.

* cited by examiner

Primary Examiner—Flemming Saether
(74) Attorney, Agent, or Firm—Volpe and Koenig P.C.

(57) ABSTRACT

A hole-shaping and thread-forming screw (1) has a non-cutting hole-shaping end section (2) that ends in a point, a haft section (4) provided with a thread (3) and an engagement section (5). The non-cutting hole-shaping end section (2) tapers towards its end. The whole screw is made of a stainless material, in particular its end section (2). When the screw (1) is driven in, a hole is haped without cutting into the workpiece (7) and is then threaded by the screw (1) itself.

12 Claims, 2 Drawing Sheets ns skilled in the art, to shape a hole with a screw made of
a stainless material. Rather, it was always assumed that a

NON CUTTING HOLE-SHAPING AND THREAD-FORMING STAINLESS SCREW AND PROCESS WITH IMPACT FOR DRIVING IN THE SAME

BACKGROUND OF THE INVENTION

The invention relates to a hole-shaping and thread-forming screw with a non-cutting hole-shaping end section that ends in a point or a point-like shape, a shaft section provided with a thread, and an engagement section for attaching or inserting a tool, as well as a method for driving in a hole-shaping and thread-forming screw.

In the case of thread-shaping screws, which drill their own hole or shape it without cutting, it was standard procedure until now to manufacture the hole-shaping end section of a material that could be hardened, in other words carbon steel. In most instances, expensive solutions were provided, if the head and partial sections of the shaft had to be manufactured from a stainless material. In addition, welding solutions were used, where a drill tip of material that could be hardened, in other words carbon steel, was welded to the other region of the screw.

This not only requires several work steps, it also results in particularly high manufacturing costs.

The present invention has therefore set itself the task of creating a possibility, for a screw made of stainless steel, of shaping a hole with this screw, without having to use welding solutions with different materials.

According to the invention, it is proposed that the non-cutting hole-shaping end section, which narrows at an acute angle towards the end, relative to the screw axis, is formed of a stainless material.

Screws with the embodiment explained initially have become known in various embodiment variants. For example, in U.S. Pat. No. 2,015,159, a fastener is shown and described, which has a nail tip and a corresponding thread on the shaft. By hitting the screw with a hammer, the tip is forced through a thin metal sheet, and subsequently it is driven in by means of a corresponding rotational movement of the threaded section. This combination of a nail and a screw was surely manufactured of a carbon steel at the time of the application, since there was probably no idea of stainless attachment elements at that time. From EP-B1 0 464 071, a hole-shaping and thread-forming screw is known, which has a hole-shaping part that narrows, where the screw is made in one piece of annealed steel. By means of rotation of the screw, friction surfaces are formed between the screw and the sheet metal to be passed through, so that the metal sheet is heated in such a way that the material is brought into its plastic range, in that it becomes so resilient in the radial direction that the desired hole expansion with material displacement to form a nozzle occurs. In this embodiment, also, an attempt was made to reach a solution with a carbon steel.

With the present invention, the possibility is created, for the first time, of shaping the hole for the thread-cutting screw with a corresponding end section made of a stainless material. Until now, it was considered impossible, by persons skilled in the art, to shape a hole with a screw made of a stainless material. Rather, it was always assumed that a drilling process or a corresponding high level of heating, up to the plastic range, was required, in order to be able to drill or simply shape a hole. A person skilled in the art had to assume, until now, that a drilling process with corresponding "cutting edges" made of stainless steel is completely impossible, and that the use of carbon steel, in other words annealed steel, is required for shaping a hole without using drill blades.

SUMMARY OF THE INVENTION

The present invention has therefore overcome a prejudice of persons skilled in the art, because it was made possible to shape the hole with a screw made of stainless material, and furthermore also a stainless end section, to form the thread, and therefore to be able to use a fastener which is entirely formed of stainless material.

Therefore it is also a particular characteristic, according to the present invention, that all the sections of the screw are entirely made of a stainless material.

It is possible that a stainless steel is used as the stainless material, or that light metals or alloys of light metals, i.e. alloys with a major proportion of light metals, e.g. brass, copper, aluminum, or similar metals, are used as the stainless material. Depending on the specific purpose of use, the structure according to the invention results in very specific possibilities of use of a screw made of a special material. For example, it has now become possible to make the material selection with mutual adaptation of the work piece and the screw, without any special welding solutions or the attachment of drill plates of different materials being required.

For the hole-shaping end section, various embodiment variants are possible, with different design variants resulting as a function of the material of the work piece and, of course, as a function of the material of the screw. For example, it is possible that the non-cutting hole-shaping end section is formed from two or more partial sections with different angles relative to the screw axis. In this connection, it is also possible that the non-cutting hole-shaping end section is made to be triangular or polyangular, circular, ellipsoid, of a constant diameter, or similar in cross-section.

It is particularly advantageous if a special method is used to drive the screw in. According to the invention, it is proposed in this regard that when the screw is driven in to shape the hole in non-cutting manner, an axial impact effect is exerted on the screw in addition to the rotational drive. It has been shown that the additional impact effect is particularly advantageous, specifically when using screws made of stainless material, and that it results in rapid penetration of the work piece without significant heat development.

Furthermore, the additional process step that the impact effect on the screw acts only during the hole-shaping process and is eliminated during the thread-cutting process and while the screw is driven into the thread, is advantageous. In other words, once the hole has been shaped, the impact effect is removed, so that the thread can be formed in optimum manner. This results in an optimum fit, particularly during thread forming, and the fact that the hole wall has been partially elastically deformed during the preceding hole-shaping process also contributes to this fit, so that now this hole wall is more or less resiliently pressed against the thread.

BRIEF DESCRIPTION OF THE DRAWINGS

Further characteristics according to the invention and special advantages will be explained in greater detail in the specification below, on the basis of the drawing. This shows.

DESCRIPTION OF PREFERRED EMBODIMENTS

Figure 1:
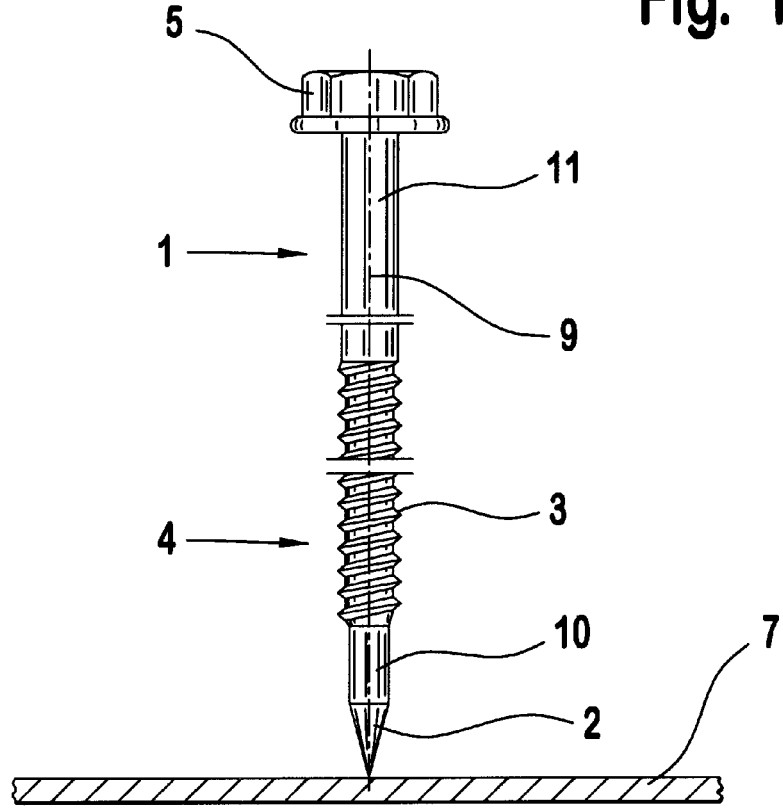
FIG. 1 a view of a screw when used to penetrate a work piece.
Figure 2:
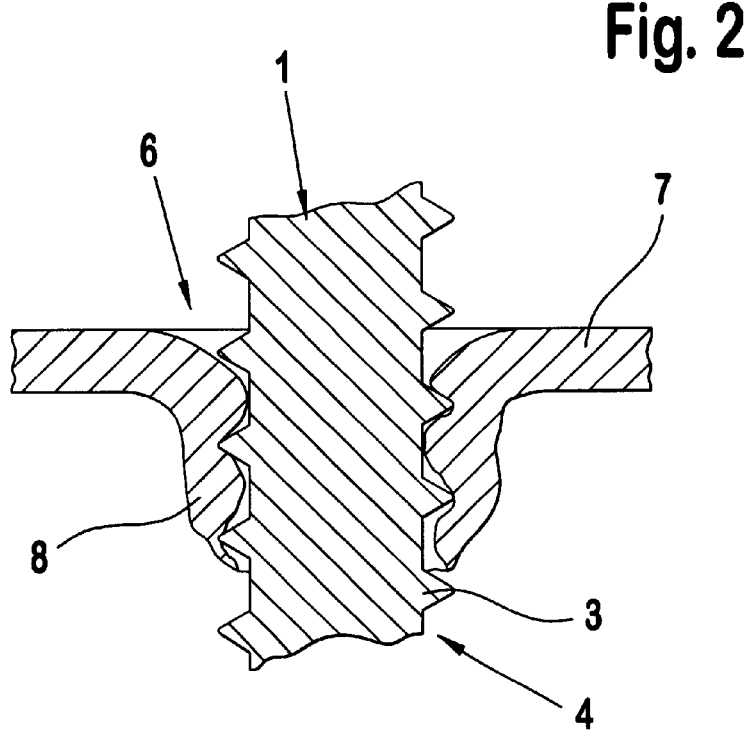
FIG. 2 a cross-section through the work piece and the screw after the thread has been formed in the previously shaped hole.
Figure 3A:
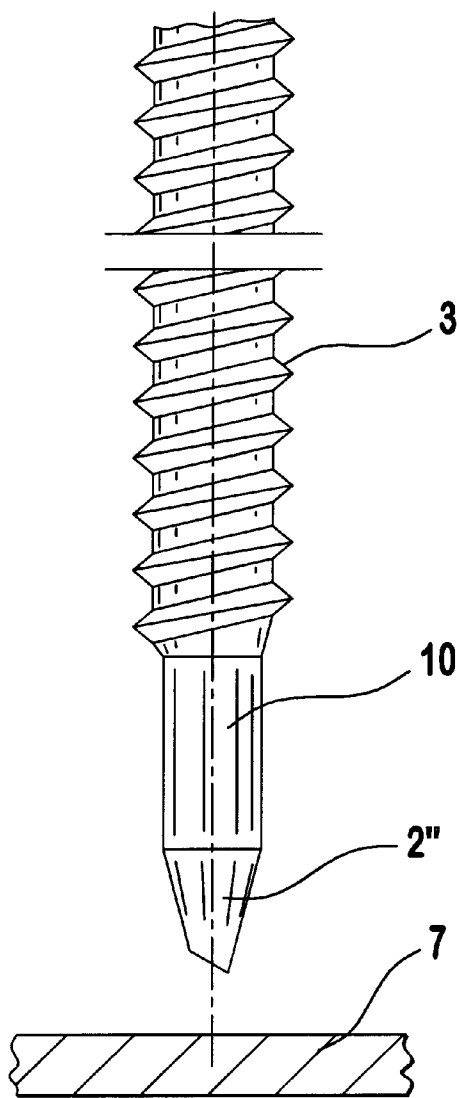
FIGS. 3a and 3b are similar to FIG. 1 and illustrate alternative embodiments in accordance the invention, having trapezoidally shaped points.
Figure 3B:
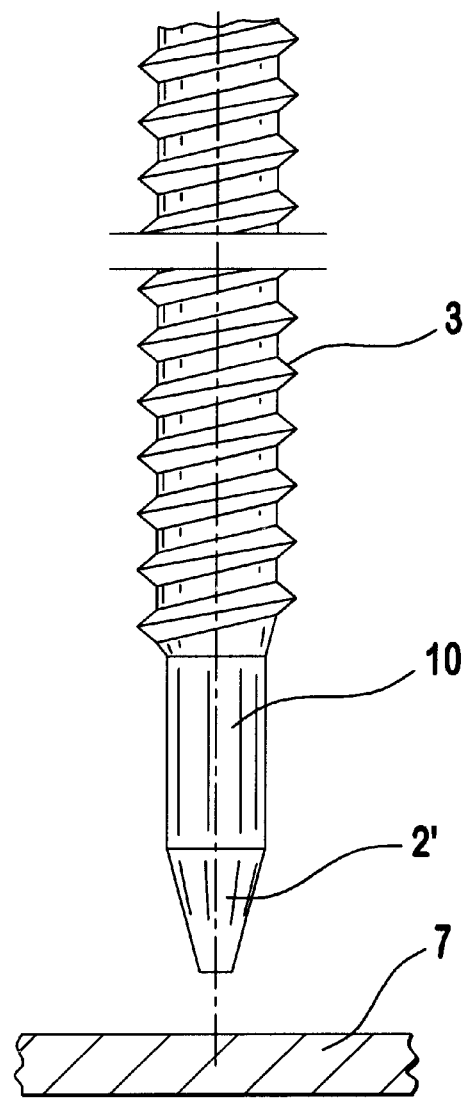

The screw 1 consists, for one thing, of an end section 2 that ends in a point or a point-like shape, a shaft section 4 provided with a thread 3, and an engagement section 5 for attaching or inserting a tool. The end section 2 is provided in order to shape a hole 6 in a work piece 7, without cutting, whereupon the shaft section 4 provided with a thread 3 forms the thread in the shaped hole 6, i.e. into the hole delimitation wall 8 which extends downward.

The non-cutting hole-shaping end section 2 is formed to narrow at an acute angle towards the screw axis 9. The essential characteristic of the screw 1 is to be seen, however, in the fact that it is made of a stainless material. In this connection, this has been taken so far that all the sections 2, 4, and 5, in other words the entire screw 1, are entirely made of a stainless material.

A version of a stainless steel can be used as the stainless material, or, of course, light metals or alloys of light metals, i.e. alloys with a major proportion of light metals, can be used. For example, it is possible that such screws 1 according to the invention be made of brass, copper, aluminum, or similar metals. Within the scope of the invention, it is also possible to make such screws of plastic, where correspondingly strong plastics can be used, in order to shape holes and form threads in work pieces made of plastic, for example, or of light metal, or in corresponding steel sheets.

The special design structure of the end section 2 is possible in several variants. In the embodiment shown, a simple cone tip is provided. It is also possible, however, to make this non-cutting hole-shaping end section 2 pyramid-shaped or, for example, in the shape of a truncated cone or a truncated pyramid. In experiments, it has been shown that it is not absolutely necessary for an extreme point to be formed at the end section 2, in order to achieve the proper effect of hole shaping. Several cross-section variants are also possible for the non-cutting hole-shaping end section 2. For example, the cross-section could be triangular or more than triangular, circular, ellipsoid, of a constant diameter, or a similar shape. It would also be possible that the immediate "tip" itself could be circular, ellipsoid, of a constant diameter, or a similar shape when seen in a top view. It is advantageous if such a screw is driven in using a special method. The time for hole shaping is significantly reduced, if an axial impact effect is exerted on the screw when the screw is driven in to shape the hole in non-cutting manner. In other words, by using a corresponding rotational drive with an impact effect in the axial direction, shaping of the hole can be brought about much more quickly. In itself, it would be possible to superimpose an impact that acts in the direction of rotation on the rotational drive, but this has no influence on the effectiveness and the period of shaping.

It is particularly advantageous if no impact effect is present any more after shaping the hole for the subsequent thread-forming process and while the screw is driven in, so that only the necessary rotational drive is present. This results in a significantly better fit in the work piece.

The screw shown in FIG. 1 is a relatively short screw with a threaded section 4 which follows a cylindrical section 10, and a subsequent, thread-free section 11 which reaches to the engagement section 5. The measures according to the invention can, of course, be used for screws of all lengths, and have a positive effect particularly in the case of very long screws, since in many instances long screws, specifically, are to be made of stainless material. It is also possible to continue the threaded section 4 over the entire length of the screw shaft, or to provide several threaded sections consecutively, with spaces between them, where the threaded sections can also have different diameters.

What is claimed is:

1. Hole-shaping and thread forming screw for piercing and fastening material and having a longitudinal axis, a first end and a second end, comprising:
   - a non-cutting hole-shaping end section at said first end having a non-circular cross-section and a tapered surface for piercing a hole in said material when said screw is driven;
   - a shaft section connected to said first end section and provided with a cutting thread for threading said hole by cutting a thread in a side wall of said hole when said screw is driven; and
   - an engagement section at said second end for attaching or inserting a driving tool, the first end section of the screw narrowing at an acute angle relative to the screw axis, and said entire screw being of a stainless material.

2. Screw according to claim 1 wherein stainless steel is the stainless material.

3. Screw according to claim 1, wherein alloys with a major proportion of one of brass, copper, and aluminum are the stainless material.

4. Screw according to claim 1, wherein the non-cutting hole-shaping end section has at least two partial sections with different angles relative to the screw axis.

5. Screw according to claim 1, wherein the non-cutting hole-shaping end section is one of triangular, polyangular, and ellipsoid in cross-section.

6. A method of driving in a hole-shaping and thread forming screw having a longitudinal axis, a hole-shaping section and a thread forming section, the entire screw being a non-hardened stainless material, comprising the steps:
   (a) driving said screw into a material in a direction of said axis to shape a hole with said hole-shaping section in said material in a non-cutting manner;
   (b) rotating said screw about said axis during step (a);
   (c) impacting said screw in said direction of said axis during step (a);
   (d) cutting a thread in said shaped hole with said thread forming section to make a threaded hole; and
   (e) driving said threaded section into said threaded hole.

7. The method of claim 6 wherein said axial impacting is exerted only during said hole shaping.

8. A workpiece in combination with a hole-shaping and thread forming screw comprising:
- the screw having a longitudinal axis, a first end and a second end, being of a non-hardened stainless material;
- a non-cutting hole-shaping end section at said first end including a tapered surface for piercing a hole in the workpiece when the screw is driven;
- a shaft section connected to said first end section and provided with a cutting thread for threading the hole by cutting a thread in a side wall of the hole when the screw is driven;
- an engagement section at said second end for attaching or inserting a driving tool, the first end section of the screw narrowing at an acute angle relative to the screw axis; and
- the screw being threadedly engaged with the workpiece in a hole made by said first end.

9. The invention according to claim 8 wherein stainless steel is the stainless material.

10. The invention according to claim 8 wherein alloys with a major portion of one of brass, copper, and aluminum are the stainless material.

11. The invention according to claim 8 wherein the non-cutting hole-shaping end section has at least two partial sections with different angles relative to the screw axis.

12. The invention according to claim 8 wherein the non-cutting hole-shaping end section is one of triangular, polyangular, circular, and ellipsoid in cross-section.

* * * * *